(12) United States Patent
Liu et al.

(10) Patent No.: US 8,093,519 B2
(45) Date of Patent: Jan. 10, 2012

(54) KEYPAD MODULE OF NON-BACKLIGHT PANEL AND PANEL ASSEMBLY OF THE SAME

(75) Inventors: Chang-Li Liu, Taoyuan (TW); Che-Tung Wu, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 989 days.

(21) Appl. No.: 12/037,240

(22) Filed: Feb. 26, 2008

(65) Prior Publication Data

US 2009/0167689 A1 Jul. 2, 2009

(30) Foreign Application Priority Data

Jan. 2, 2008 (TW) ................................ 97200037 U

(51) Int. Cl.
*H01H 9/00* (2006.01)
(52) U.S. Cl. ........................................................ 200/310
(58) Field of Classification Search .................. 200/333, 200/512–517, 310, 308, 341–345
See application file for complete search history.

(56) References Cited

U.S. PATENT DOCUMENTS

| 5,912,083 | A | 6/1999 | Jimu et al. | |
|---|---|---|---|---|
| 7,099,465 | B2 | 8/2006 | Nishi | |
| 7,277,274 | B2 | 10/2007 | Park | |
| 2003/0196882 | A1* | 10/2003 | Ootsuka et al. | 200/517 |
| 2005/0121299 | A1* | 6/2005 | Ide et al. | 200/310 |
| 2008/0223702 | A1* | 9/2008 | Hsu | 200/333 |

* cited by examiner

*Primary Examiner* — Edwin A. Leon
(74) *Attorney, Agent, or Firm* — Chun-Ming Shih; HDLS IPR Services

(57) ABSTRACT

A keypad module includes a non-backlight layer made of an opaque thin sheet, and a key layer made of an ultraviolet curable resin. One surface of the non-backlight layer is provided thereon with a recognition region. The key layer has a base portion and a plurality of pressing portions protruding from the base portion. The base portion is overlapped with and bonded to the surface of the non-backlight layer on which the recognition region is provided. Each of the pressing portions is arranged to correspond to the recognition region. The panel further includes a telecommunication module located below the keypad module.

17 Claims, 9 Drawing Sheets

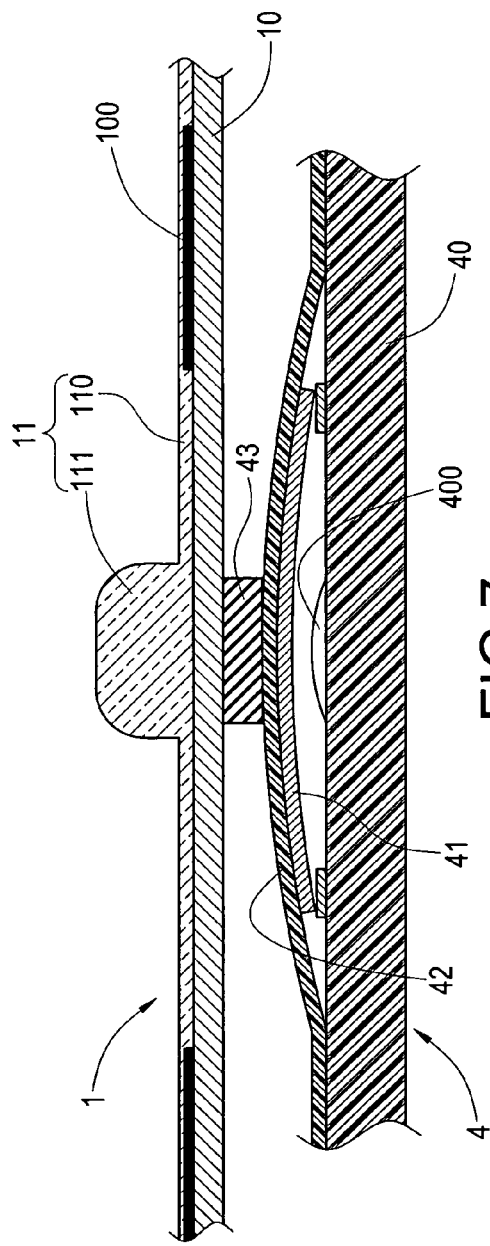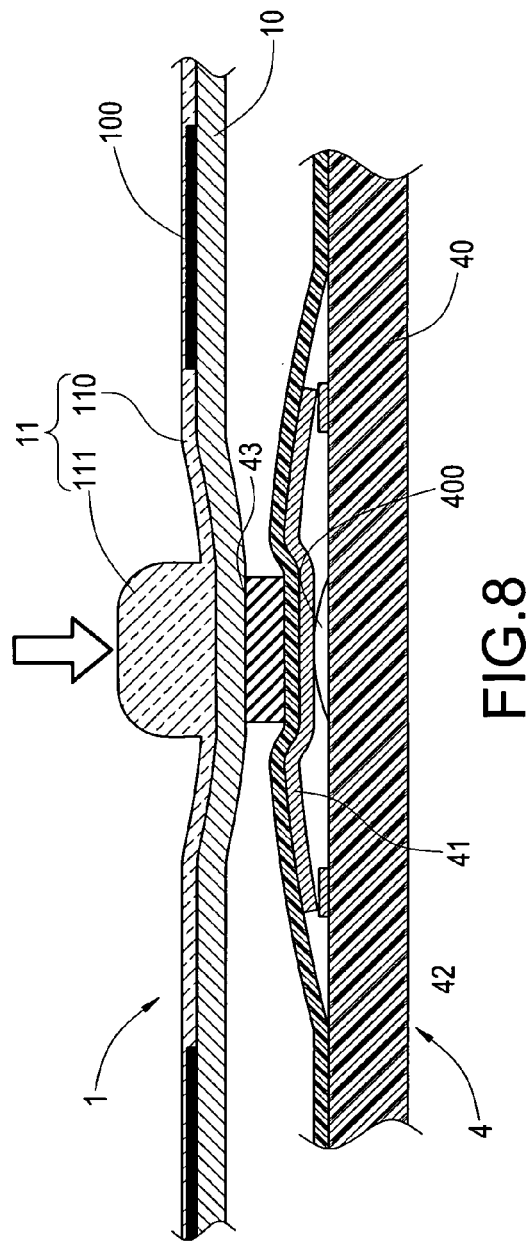

KEYPAD MODULE OF NON-BACKLIGHT PANEL AND PANEL ASSEMBLY OF THE SAME

BACKGROUND OF THE INVENTION

1. Field of the Invention

The present invention relates to a hardware operating interface, and in particular to a keypad panel that can be applied to an electronic product, such as a mobile phone or personal digital assistant (PDA).

2. Description of Prior Art

A keypad assembly is one of the primary input means for an electronic device. The surface of each key of the keypad assembly is provided with corresponding numerals, characters, phonetic symbols, roots for an input method and/or various functional icons, so that a user can input correct data or perform various functions of the electronic device. Therefore, for an electronic device, the keypad assembly acts as an important human/machine interface.

Since the light may be sometimes insufficient for a working environment of an electronic device, the keypad panel is usually provided with a light source to generate sufficient light for recognition, so that the user can still operate the keypad panel even though the light is dim. However, not all of the electronic devices may encounter the problem that the light in the surrounding environment is insufficient during an input action. Therefore, it is an important issue to manufacture a keypad module that can provide accurate locations of each key and a good touch feeling of pressing even though the panel does not provide a light source.

In view of the above, the inventor proposes a keypad module which provides a pressing interface for a non-backlight panel and has a touch feeling of pressing based on his researches and expert experience.

SUMMARY OF THE INVENTION

The present invention is to provide a keypad module of a non-backlight panel and a panel assembly of the same, which can be applied to a non-backlight panel and increase the touch feeling of pressing for the user. Thus, the user can recognize whether he/she has completed the pressing action according to the touch feeling.

The present invention provides a keypad module of a non-backlight panel, which includes a non-backlight layer made of an opaque thin sheet, and a key layer made of an ultraviolet curable resin. One surface of the non-backlight layer is provided thereon with a recognition region. The key layer has a base portion and a plurality of pressing portions protruding from the base portion. The base portion is overlapped with and bonded to the surface of the non-backlight layer on which the recognition region is provided. Each of the pressing portions is arranged to correspond to the recognition region. With the above arrangement, a keypad module of a non-backlight panel can be obtained.

The present invention also provides a non-backlight panel, which includes a keypad module described above and a telecommunication module. The telecommunication module has a circuit board located below the non-backlight layer. The circuit board is provided thereon with a plurality of contacting points. Each of the contacting points corresponds to each pressing portion. With the above arrangement, a non-backlight panel can be obtained.

BRIEF DESCRIPTION OF THE DRAWINGS

FIG. 7 is a partially cross-sectional view showing the non-backlight panel of the present invention;

FIG. 8 is a schematic view showing the action of FIG. 7;

DETAILED DESCRIPTION OF THE INVENTION

In order to make the Examiner to better understand the characteristics and technical contents of the present invention, a detailed description relating thereto will be made with reference to the accompanying drawings. However, the drawings are illustrative only, but not used to limit the scope of the present invention.

Figure 1:
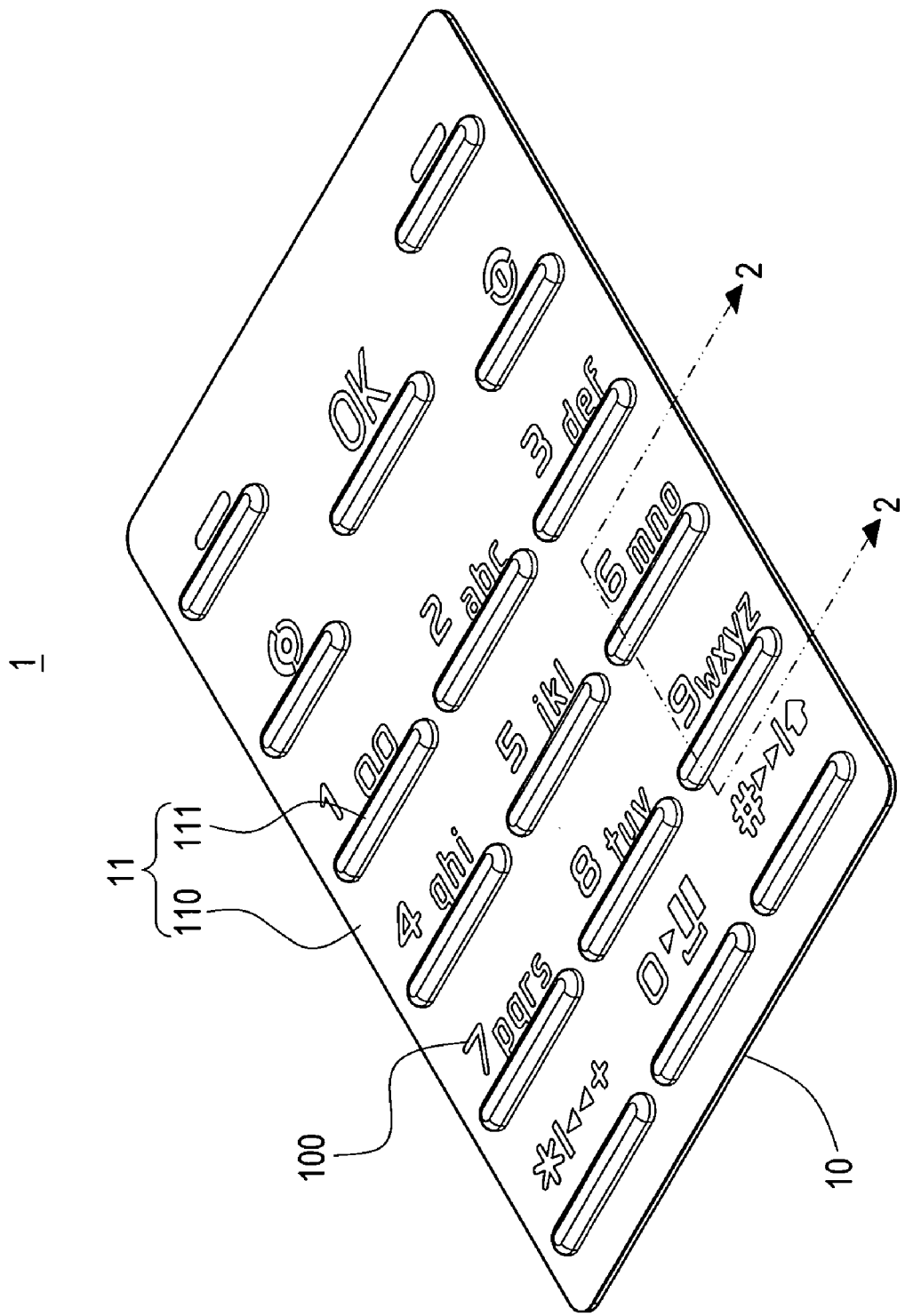
FIG. 1 is a perspective view of the present invention.
Figure 2:
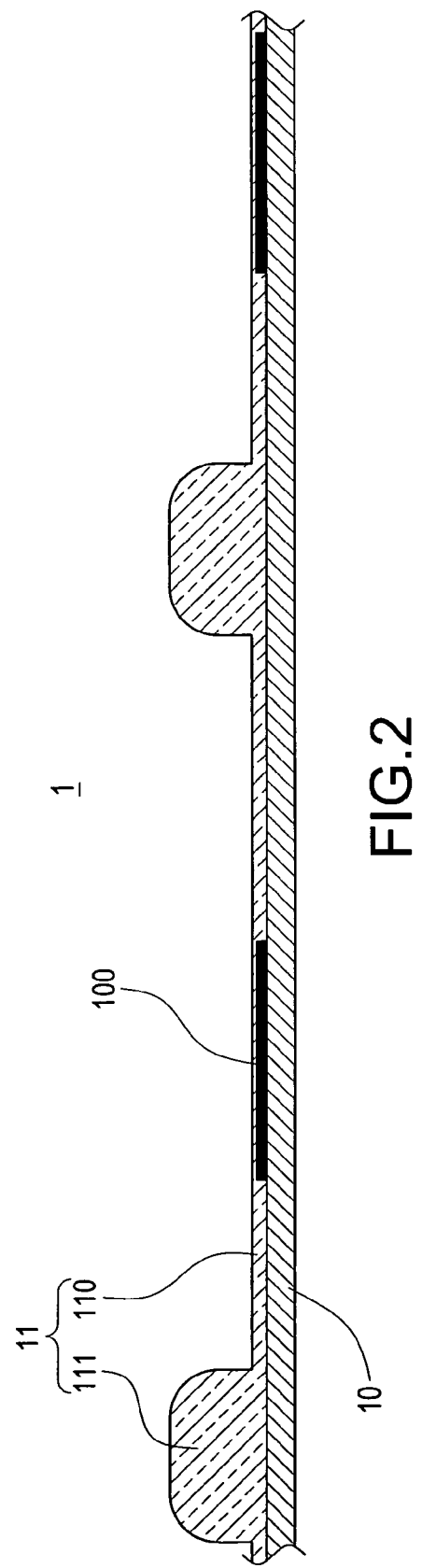
FIG. 2 is a cross-sectional view taken along the line 2-2 in FIG. 1.

The present invention provides a keypad module of a non-backlight panel and a panel assembly of the same. As shown in FIGS. 1 and 2, the keypad module 1 is constituted of a non-backlight layer 10 and a key layer 11. As shown in FIGS. 7 and 8, the panel is constituted of a keypad module 1 and a telecommunication module.

Figure 6:
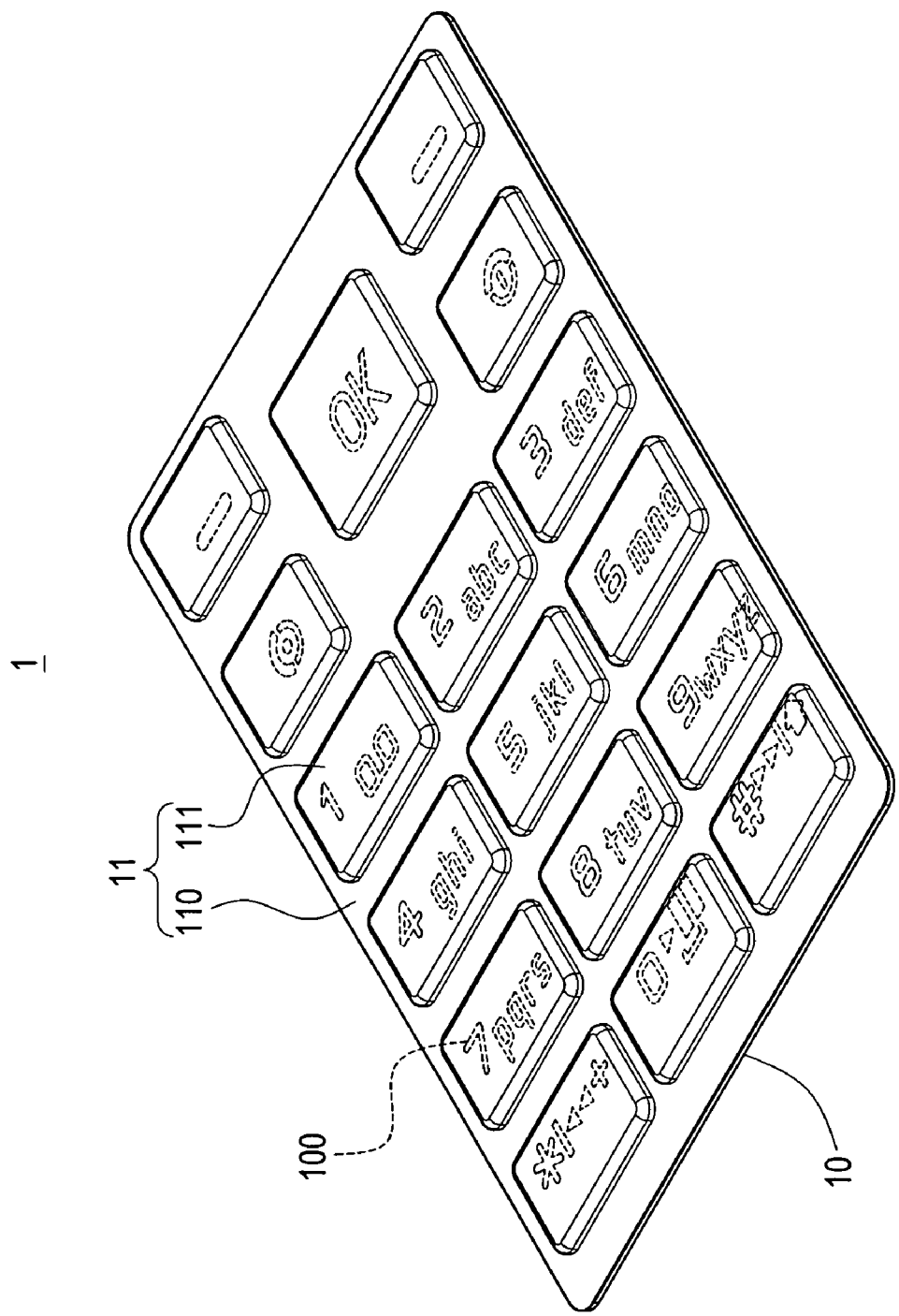
FIG. 6 is a perspective view showing another embodiment of the present invention.

Please refer to FIGS. 1 and 2. According to the above, the keypad module 1 is constituted of the non-backlight layer 10, and the key layer 11 overlapped with the non-backlight layer 10. The non-backlight layer 10 is a thin sheet made of an opaque material, such as a circuit board, wood, cork, leather, metal or the like. Via a printing, etching or an electronic ink developing process, one surface of the non-backlight layer 10 is provided with a recognition region 100 constituted of numerals, characters, phonetic symbols, roots for an input method and/or various functional icons. The key layer 11 is overlapped on the surface of the non-backlight layer 10 which is provided thereon with the recognition region 100. The key layer 11 has a base portion 110 that is overlapped with and adhered completely to the surface of the non-backlight layer 10, and a plurality of pressing portions 111 protruding from the base portion 110. Each of the pressing portions 111 is arranged to correspond to the associated recognition region 100. As shown in FIG. 1, each of the pressing portions 111 is adjacent to one side of the corresponding recognition region 100. Alternatively, as shown in FIG. 6, each of the pressing portions 111 is overlapped on the corresponding recognition region 100.

Figure 3:
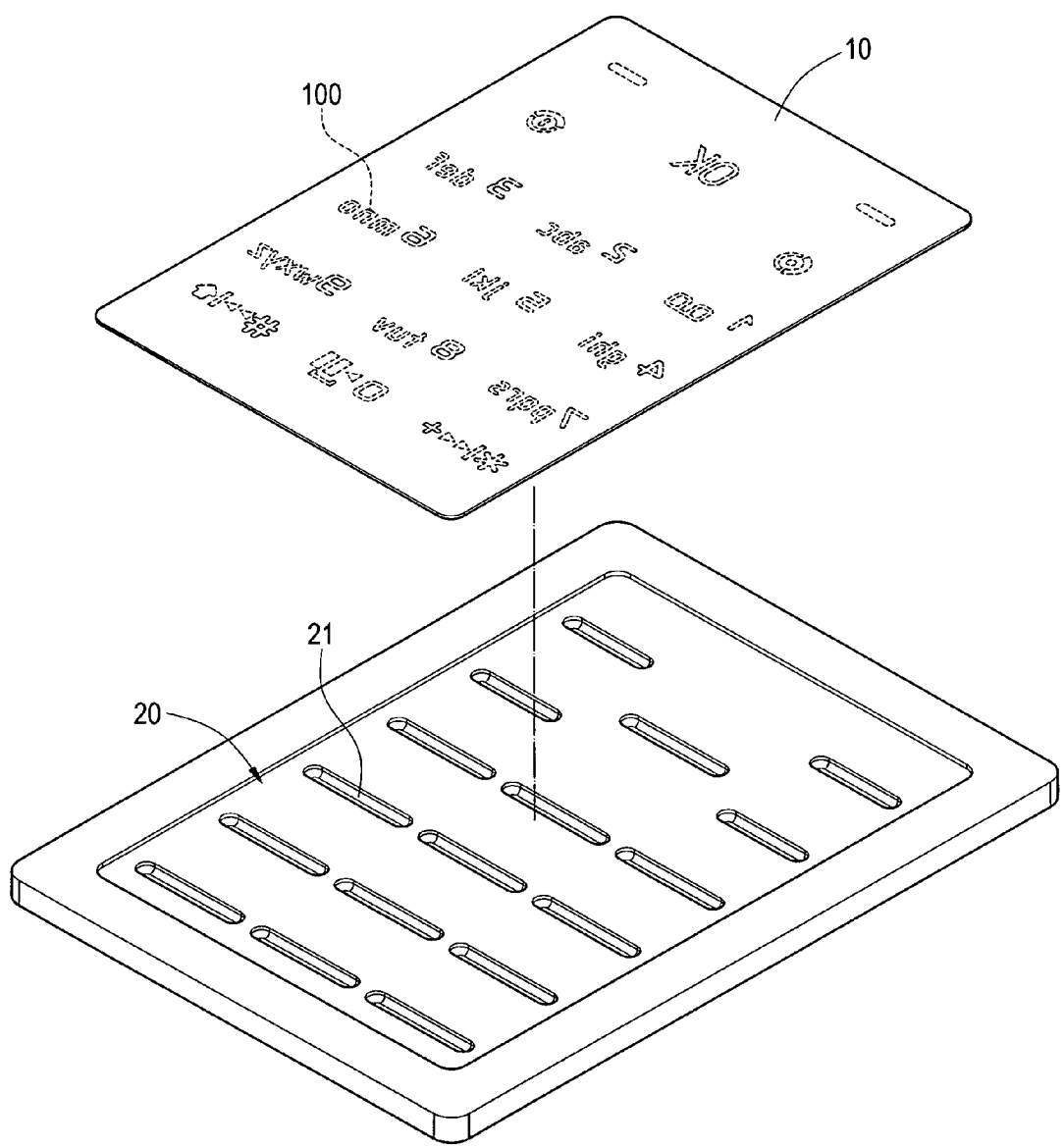
FIG. 3 is a perspective view showing the state before the non-backlight layer is disposed in the module of the present invention.
Figure 4:
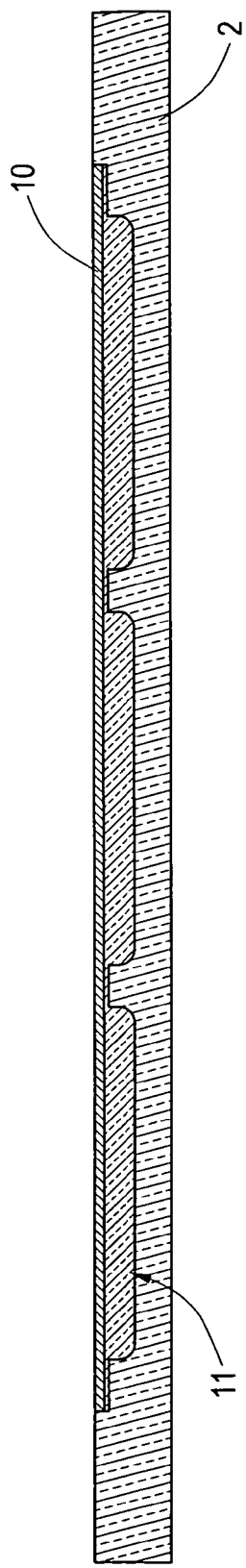
FIG. 4 is a plan cross-sectional view showing the state after the non-backlight layer is disposed in the module of the present invention.
Figure 5:
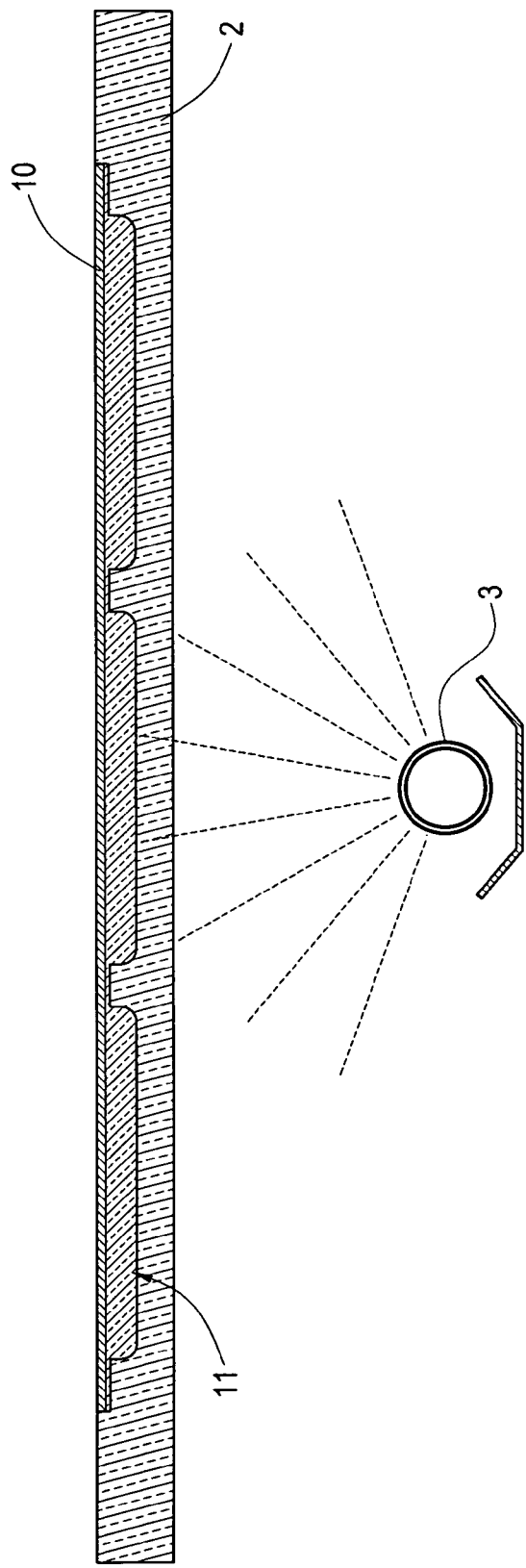
FIG. 5 is a schematic view showing the ultraviolet curable resin in the mold of the present invention being cured by an ultraviolet light source.

Please refer to FIGS. 3 to 5. The non-backlight layer 10 and the key layer 11 are adhered to each other to form a unit. The key layer 11 is made of an ultraviolet curable resin and thus has a light-transmitting property. After being adhered on the non-backlight layer 10, the recognition region 100 can be still seen because of the light-transmitting property of the key layer 11. The process of the present invention will be described as follows.

As shown in FIG. 3, first, the non-backlight layer 10 is formed thereon with a recognition region 100 by means of a printing or etching process. A mold 2 for constituting the key layer 11 is prepared. The mold 2 is made of a light-transmitting material, which allows the ultraviolet light to pass through. Then, the mold 2 is formed thereon with a cavity 20 for constituting the key layer 11. In addition to form a base portion 110 of the key layer 11, the cavity 20 also has a plurality of holes 21 for constituting each pressing portion 111.

As shown in FIG. 4, a gel-like ultraviolet curable resin is injected into the cavity 20 of the mold 2. After all the holes 21 are filled with the resin and before the ultraviolet curable resin is cured completely, the non-backlight layer 10 provided with the recognition region 100 is adhered on the cavity 20.

As shown in FIG. 5, the mold 2 is irradiated with an ultraviolet light source 3, thereby curing the ultraviolet curable resin injected into the cavity 20 rapidly. After the resin is cured, the cured ultraviolet curable resin and the non-backlight layer 10 are taken out, thereby obtaining the keypad module 1.

Please refer to FIG. 7. The present invention also provides a non-backlight panel, which includes the keypad module 1 described above and a telecommunication module 4. The keypad module 1 is manufactured according to the above-mentioned process. The telecommunication module 4 has a flexible printed circuit board 40. The circuit board 40 is provided thereon with a plurality of contacting points 400. Each of the contacting points 400 corresponds to each pressing portion 111 of the keypad module 1 in a vertical direction. Each of the contacting points 400 is provided thereon with a corresponding metal sheet 41. The circuit board 40 is provided thereon with an elastic film 42 for covering each metal sheet 41. A plurality of protrusions 43 is provided between the elastic film 42 and the keypad module 1. Each protrusion 43 corresponds to the underside of each pressing portion 111 of the keypad module 1.

As shown in FIG. 8, when the user applies a downward force to press any pressing portion 111, the corresponding protrusion 43 is pressed to bias downwardly the elastic film 42 and the metal sheet 41 so as to touch the corresponding contacting point 400, thereby achieving an input action. In this way, the user can recognize the pressed location via each pressing portion 110 and thus obtain a touch feeling of pressing. Therefore, the user can judge whether the pressing action is completed or not via the touch feeling.

Therefore, via the above configuration, the keypad module of a non-backlight panel and the panel assembly of the same according to the present invention can be obtained.

Figure 9:
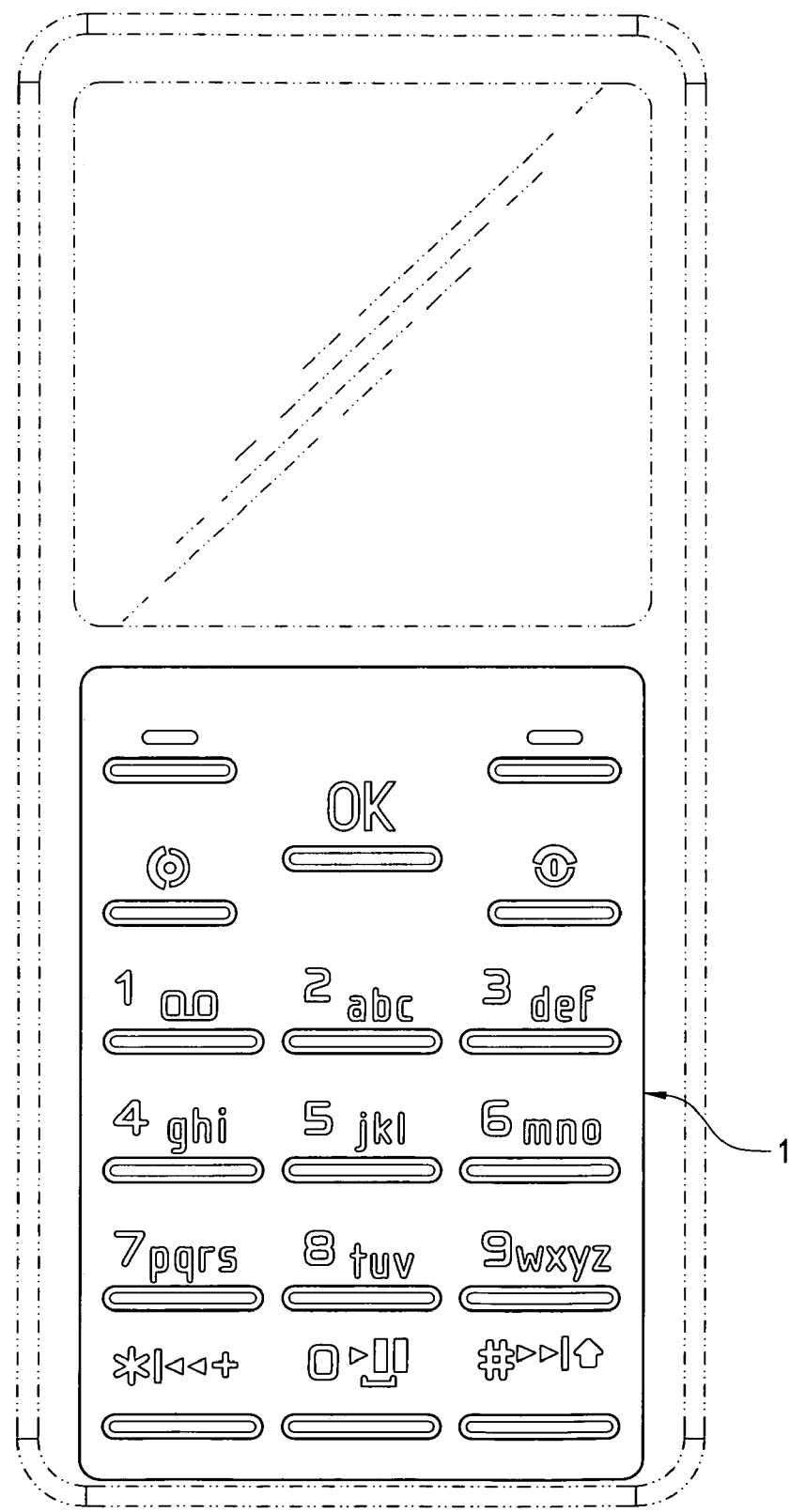
FIG. 9 is a schematic view showing the present invention being used in a mobile phone.
Figure 10:
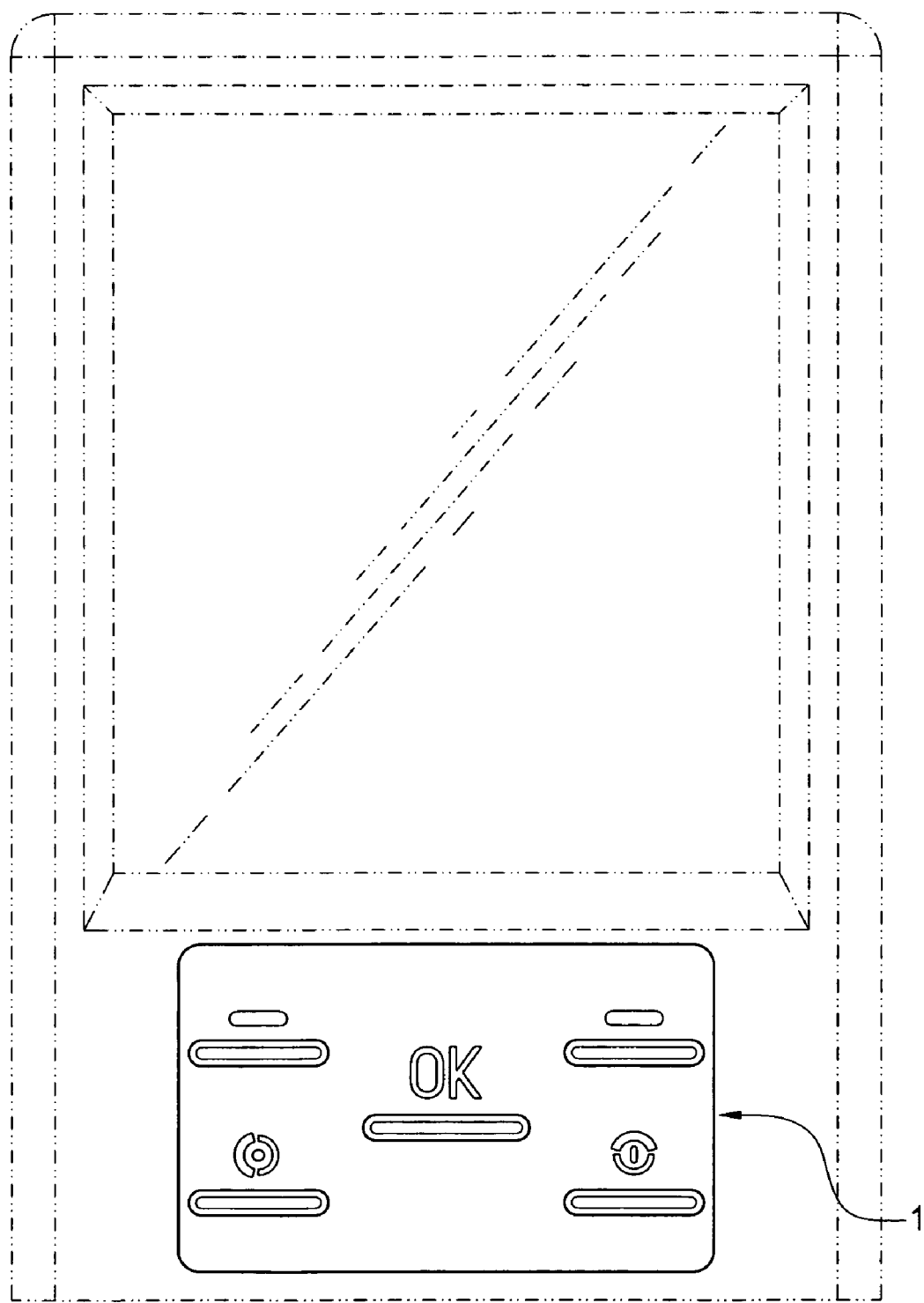
FIG. 10 is a schematic view showing the present invention being used in a personal digital assistant.
Figure 11:
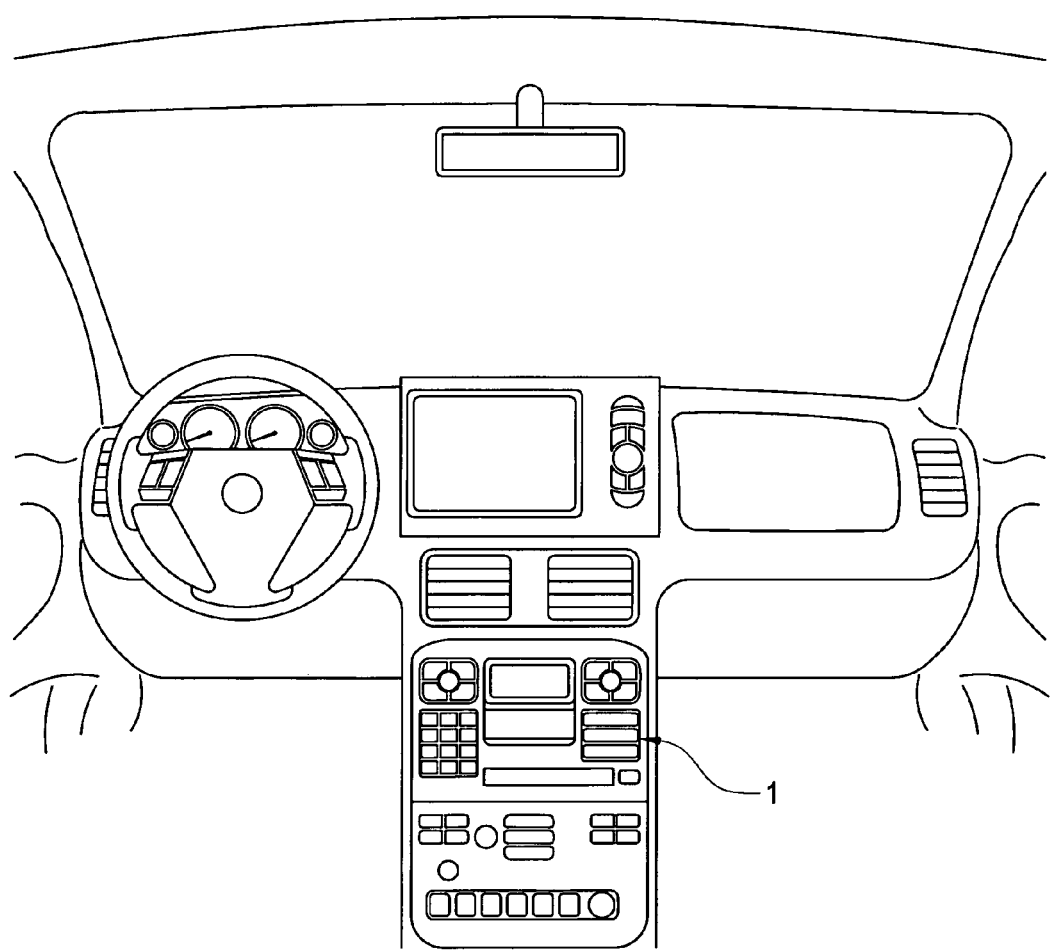
FIG. 11 is a schematic view showing the present invention being used in an automobile control interface.

Further, please refer to FIGS. 9 to 11. The keypad module of a non-backlight panel and the panel assembly of the same according to the present invention can be applied at least to a mobile phone, a personal digital assistant (PDA) and an automobile control interface. Of course, the application is not limited to the above cases and the present invention can be applied to other human/machine operating interfaces.

According to the above, the present invention really achieves the desired objects and solves the drawbacks of prior art. Further, the present invention has novelty and inventive steps, and thus conforms to the requirements for a utility model patent.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A keypad module of a non-backlight panel, comprising:
    a non-backlight layer made of an opaque thin sheet, one surface of the non-backlight layer being provided thereon with a recognition region; and
    a key layer made of an ultraviolet curable resin, the key layer having a base portion and a plurality of pressing portions protruding from the base portion, the base portion being overlapped with and bonded to the surface of the non-backlight layer on which the recognition region is provided, each of the pressing portions being arranged to correspond to the recognition region.

2. The keypad module of a non-backlight panel according to claim 1, wherein the non-backlight layer is made of a circuit board, wood, cork, leather or metal.

3. The keypad module of a non-backlight panel according to claim 1, wherein the recognition region includes numerals, characters, phonetic symbols, roots for an input method and/or various functional icons.

4. The keypad module of a non-backlight panel according to claim 1, wherein the recognition region is provided on the non-backlight layer by means of a printing process.

5. The keypad module of a non-backlight panel according to claim 1, wherein the recognition region is provided on the non-backlight layer by means of an etching process.

6. The keypad module of a non-backlight panel according to claim 1, wherein the recognition region is developed on the non-backlight layer by means of electronic inks.

7. The keypad module of a non-backlight panel according to claim 1, wherein each of the pressing portions is adjacent to one side of the corresponding recognition region.

8. The keypad module of a non-backlight panel according to claim 1, wherein each of the pressing portions is overlapped on the corresponding recognition region.

9. A non-backlight panel, comprising:
    a non-backlight layer made of an opaque thin sheet, one surface of the non-backlight layer being provided thereon with a recognition region;
    a key layer made of an ultraviolet curable resin, the key layer having a base portion and a plurality of pressing portions protruding from the base portion, the base portion being overlapped with and bonded to the surface of the non-backlight layer on which the recognition region is provided, each of the pressing portions being arranged to correspond to the recognition region; and
    a telecommunication module having a circuit board located below the non-backlight layer, the circuit board being provided thereon with a plurality of contacting points, each of the contacting points corresponding to each pressing portion.

10. The non-backlight panel according to claim 9, wherein the non-backlight layer is made of a circuit board, wood, cork, leather or metal.

11. The non-backlight panel according to claim 9, wherein the recognition region is constituted of numerals, characters, phonetic symbols, roots for an input method and/or various functional icons.

12. The non-backlight panel according to claim 9, wherein the recognition region is provided on the non-backlight layer by means of a printing process.

13. The non-backlight panel according to claim 9, wherein the recognition region is provided on the non-backlight layer by means of an etching process.

14. The non-backlight panel according to claim 9, wherein the recognition region is developed on the non-backlight layer by means of electronic inks.

15. The non-backlight panel according to claim 9, wherein each of the pressing portions is adjacent to one side of the corresponding recognition region.

16. The non-backlight panel according to claim 9, wherein each of the pressing portions is overlapped on the corresponding recognition region.

17. The non-backlight panel according to claim 9, wherein each contacting point of the telecommunication module is provided thereon with a metal sheet, the circuit board is provided thereon with an elastic film for covering each metal sheet, a plurality of protrusions is provided between the elastic film and the keypad module, and each protrusion corresponds to the underside of each pressing portion.

* * * * *